United States Patent
Kudo et al.

(10) Patent No.: US 7,564,637 B2
(45) Date of Patent: Jul. 21, 2009

(54) STORAGE MEDIA HAVING AREAS FOR STORING DATA FOR CORRECTING SERVO INFORMATION ERRORS

(75) Inventors: Fumiya Kudo, Kawasaki (JP); Mitsuo Kamimura, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 11/517,901

(22) Filed: Sep. 8, 2006

(65) Prior Publication Data

US 2007/0058277 A1  Mar. 15, 2007

(30) Foreign Application Priority Data

Sep. 14, 2005  (JP)  ............................. 2005-267287

(51) Int. Cl.
 G11B 5/09 (2006.01)
 G11B 5/596 (2006.01)
(52) U.S. Cl. ..................................... 360/48; 360/77.04
(58) Field of Classification Search ....................... None
 See application file for complete search history.

(56) References Cited

U.S. PATENT DOCUMENTS

| 5,963,398 A | 10/1999 | Tohkairin | ................... 360/106 |
|---|---|---|---|
| 6,671,119 B2* | 12/2003 | Baumann et al. | ......... 360/77.08 |
| 6,970,320 B2* | 11/2005 | Sugiyama et al. | ............. 360/75 |
| 7,027,256 B1* | 4/2006 | Subrahmanyam et al. | ....................... 360/77.08 |
| 7,082,008 B2 | 7/2006 | Ashikaga et al. | |
| 2002/0109933 A1 | 8/2002 | Ashikaga et al. | ......... 360/77.04 |
| 2003/0112539 A1 | 6/2003 | Shu | |

FOREIGN PATENT DOCUMENTS

| JP | 60-117461 | 6/1985 |
|---|---|---|
| JP | 03-263662 | 11/1991 |
| JP | 09-091903 | 4/1997 |
| JP | 2002-245737 | 8/2002 |
| JP | 2002-352535 | 12/2002 |
| JP | 2004-55090 | 2/2004 |

* cited by examiner

*Primary Examiner*—Jason C Olson
(74) *Attorney, Agent, or Firm*—Greer, Burns & Crain, Ltd.

(57) ABSTRACT

A storage medium includes tracks extending in a circumferential direction, user data areas formed on the tracks for storing user data, and servo frames corresponding to the user data areas and extending in a radial direction for storing servo data. Data correcting areas corresponding to the servo frames and extending in the radial direction adjacent the servo frames are provided for storing correcting data for correcting positional deviation of a read/write head resulting from an error in the servo data stored in the servo frames. The correcting data stored in the data correcting areas on the same track are separated by at least one correcting data area.

6 Claims, 16 Drawing Sheets

STORAGE MEDIA HAVING AREAS FOR STORING DATA FOR CORRECTING SERVO INFORMATION ERRORS

FIELD OF THE INVENTION

The present invention relates to storage media and apparatus, and in particular, to head position control in view of errors in servo information recorded on a disk type storage medium.

BACKGROUND OF THE INVENTION

In an information recording and reproducing apparatus such as a hard disk drive (HDD), data can be recorded and reproduced by moving a recording/reproducing head to a target track on the surface of a rotating disk. Reducing the track pitch on a magnetic disk is one way to improve recording density. With the reduction in the track pitch, however, the distance between data written on adjacent tracks becomes smaller. As a result, errors are easily generated even when the write and read positions of the magnetic head are deviated only slightly.

Generally, during a servo track write (STW) process, the position of the magnetic head is measured and servo information is written on the magnetic disk using an external actuator for positioning the arm of an internal actuator of the magnetic disk apparatus. The servo information is typically written under conditions where a vibration is generated on a spindle motor of the hard disk drive. Consequently, the servo information is written at a position displaced from the ideal circle (locus of head which is intrinsically considered as desirable locus). As a result, the servo information includes an error element that may cause fluctuation of the magnetic head.

Moreover, there is also a problem of fluctuations in the transition of magnetization being generated in the written servo information. The surface of a magnetic disk is formed with aggregation of magnetic particles. These magnetic particles are not arranged orderly based on the size. Therefore, a boundary between signals is not straight and a large area is required for the signal for one bit.

However, in order to record data in narrower area, i.e., to record data in higher density, the boundary between signals must be linear. When high density recording is performed on the disk having these magnetic particles, the servo signal cannot be written smoothly. If the servo signal is not written smoothly, the SN-pole directions of the magnetic particles are not defined in a constant direction, and thereby, a weak area is generated in the magnetization of the servo signal. Therefore, the magnetic head cannot read the servo signal correctly and displacement and fluctuation are generated when the magnetic head follows the tracks.

A proposal has been made to write correcting data on a magnetic disk for correcting an error of a servo signal resulting from a disturbance of a position information and a magnetic fault of the magnetic disk when the servo signal is formed. The aim is to realize the positioning of the magnetic head with higher accuracy when data is read and written on the basis of the correcting data.

Japanese Patent Application Laid Open No. H03-263662 proposes a technology for writing an error signal indicating an error of the servo signal to one area or both areas before and after the serve frame of the magnetic disk in order to read such error signal in the on-track timing. Position or servo information may include an error element due to the influence of vibration resulting from the rotation of the magnetic disk at the time of forming the servo signal. The positioning error creates a large influence in high density tracks. Therefore, the error signal indicating an error of the servo signal is written to the area before the servo frame of the minimum unit in the circumferential direction of the servo signal, or to the area after the servo frame, or to both areas before and after the servo frame. Since the error information is read with the magnetic head in the on-track timing, accurate positioning of the magnetic head is said to be realized for the target track by correcting an error of the servo signal.

Japanese Patent Application Laid Open No. S60-117461 proposes a technology for improving a read margin. More specifically, an original servo signal read with a servo head is input to a servo signal reproducing circuit and is then converted to the servo signal. However, if a magnetic fault is found in the original servo signal, a positional deviation is generated when the position signal of head is generated only with the servo signal obtained from the original servo signal. Therefore, while the tracking is performed on the basis of the servo signal including a positional deviation, the correcting signal is written on the magnetic disk with a servo head. In this case, since it is sometimes assumed that a fault is found in the track on which the correcting signal is written, multiple correcting signal is written, or the correcting signal is given the parity. Accordingly, the correcting signal is written before the part which requires a correction.

It is also known to record the correcting data in each track, as illustrated in FIG. 15, to an area 70 provided immediately after each servo frame 50, and this correcting data is alternately allocated for each servo frame through a division into a postcode area 41 for recording and a postcode area 42 for reproducing. In this case, the postcodes 41, 42 allocated to the adjacent tracks are isolated through small gap. The gap between the adjacent codes becomes even smaller when the distance (track width) between the adjacent tracks is reduced through high density in recording capacity.

FIG. 16 illustrates a fluctuation in the tracking of the magnetic head 20. If there is no allowance for providing an interval between the postcodes 41 or postcodes 42, a fluctuation is generated in the magnetic head 20 because of the vibration generated by a motor of the apparatus. Such fluctuation results in data intended for a target track 61 being over-written on the adjacent track 62 during the write operation of the postcodes 41. Such over-writing generates noise during the read operation and such noise will be output as a read error.

In addition, for allocation of the postcodes 41, 42, information indicating the start of the postcode must be added for each postcode. Therefore, when a large number of postcodes are allocated, the recording capacity of the user data area is reduced.

SUMMARY OF THE INVENTION

The present invention is directed to a storage medium and apparatus which includes tracks extending in a circumferential direction, user data areas formed on the tracks for storing user data, and servo frames corresponding to the user data areas and extending in a radial direction for storing servo data. Data correcting areas corresponding to the servo frames and extending in the radial direction adjacent the servo frames are provided for storing correcting data for correcting positional deviation of a read/write head resulting from an error in the servo data stored in the servo frames. The correcting data stored in the data correcting areas on the same track are separated by at least one correcting data area.

DETAILED DESCRIPTION OF THE PREFERRED EMBODIMENTS

Figure 1:
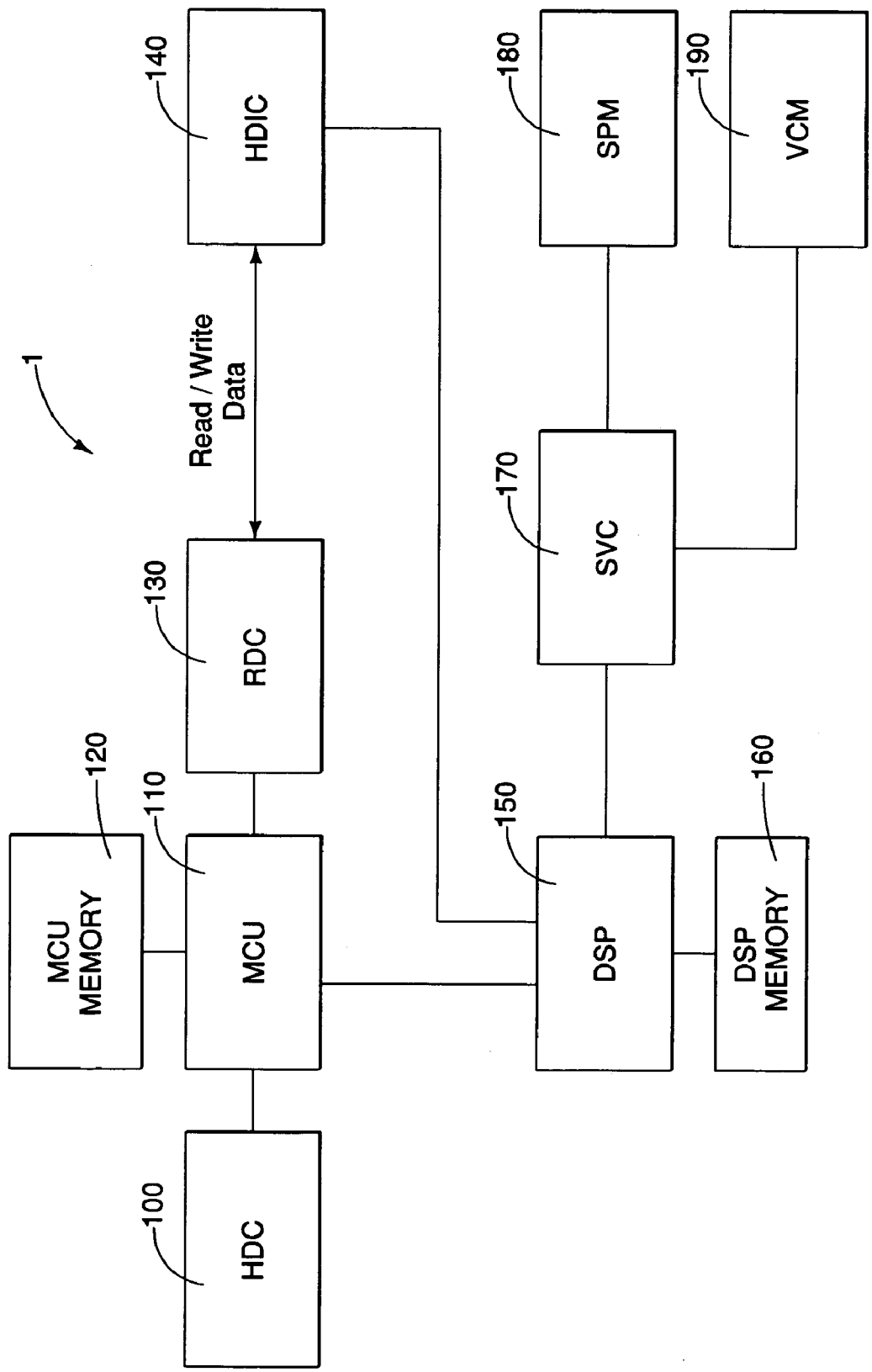
FIG. 1 is a block diagram illustrating a storage apparatus in accordance with one embodiment of the present invention.

FIG. 1 is a block diagram of a storage apparatus 1 in accordance with one embodiment of the present invention. The storage apparatus 1 includes a spindle motor (SPM) 180 for rotating a magnetic disk 10 (best shown in FIG. 4) and a voice coil motor (VCM) 190 for driving an actuator 30 having a magnetic head (recording/reproducing head) 20 (illustrated in FIG. 4) to rotate and position the magnetic head to a track provided on a magnetic disk. The magnetic head 20 is a recording/reproducing head provided with a recording element 21 and a reproducing element 22 (shown in FIG. 4).

A head IC (HDIC) 140 is provided for operation control of the magnetic head 20, including the functions of a preamplifier for amplifying the read signal, a bias current source for the magnetic head, and a driver of the magnetic head for writing and reading data to and from a plurality of magnetic heads 20. The head IC 140 controls the electrical operations of the magnetic head 20.

An RDC 130 is a PRML read channel IC for decoding analog data signals sent from the HDIC 140 at the time of reading the data by demodulating the same on the basis of the PRML system and for converting the decoded digital data into parallel signals. Moreover, the RDC 130 modulates write data by encoding the same at the time of writing the data and transmits the data signal converted to the analog signal to the HDIC 140.

A digital signal processor (DSP) 150 executes a signal process which is required to enable a servo control system to conduct the position control of the magnetic head 20. Moreover, the digital signal processor (DSP) 150 also executes a rotation number control of the SPM 180 via a servo controller (SVC) 170, and position control (seek control, tracking control) of the magnetic head 20 via the VCM 190. The DSP 150 controls the positioning of the magnetic head 20 on a magnetic disk on the basis of the data read from the magnetic disk.

A hard disk controller (HDC) 100 is an IC for exchanging various instructions, operation requests and other data with a host of the storage apparatus 1, and acquires operation requests for the storage apparatus from the host. In this embodiment, the operation requests transmitted from the host are assumed to include three kinds of requests, seek, read (reproducing) and write (recording) operations.

A microcontrol unit (MCU) 110 controls the overall operations of the storage apparatus 1. An MCU memory 120 is formed of a random access memory and a flash EEPROM, and is used as a work memory when the MCU 110 executes the control process. Moreover, the memory 120 is also used as a storage device for storing control programs executed by the MCU 110 and the characteristic data or the like of the magnetic head 20. A DSP memory 160 is a random access memory and is used as a work memory by the DSP 150 as required.

Figure 2:
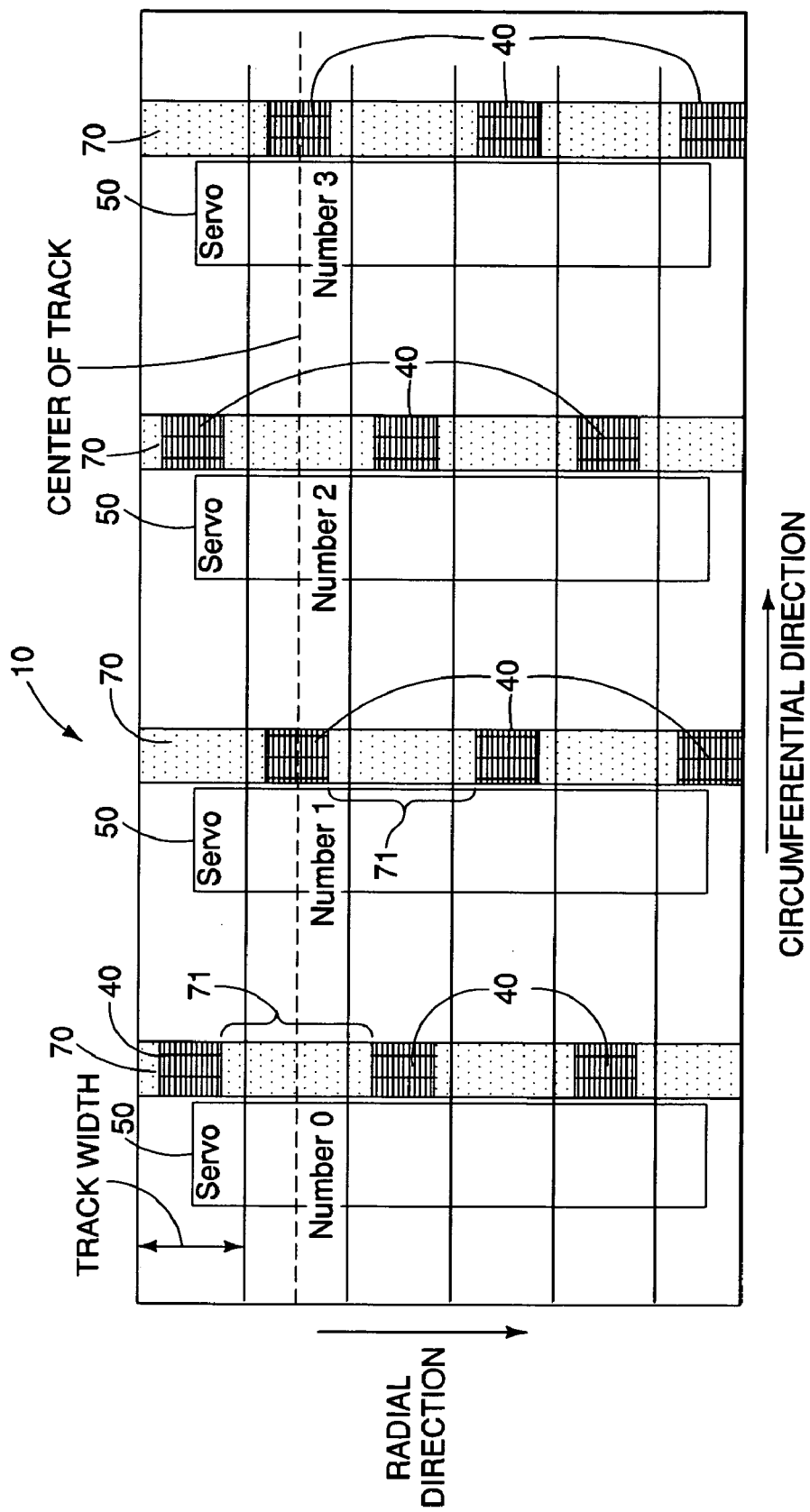
FIG. 2 is a diagram illustrating the allocation of postcodes on a recording medium in accordance with one embodiment of the present invention.

FIG. 2 is a diagram illustrating the first embodiment of the present invention for allocating postcodes 40 in a storage medium. Here, the postcode 40 is a correcting data for correcting the servo signal recorded in each servo frame.

In FIG. 2, the postcodes 40 are shown recorded in storage regions 70 immediately after the servo frames 50. The servo frames 50 are recorded radially toward the external circumferential direction from the center of the disk 10 for the purpose of recording servo data or signals used for position control of the magnetic head 20. In other words, a plurality of servo frames 50 are allocated in the circumferential direction. The storage regions 70 of the disk type storage medium are capable of reproducing the servo data with the predetermined interval in the circumferential direction and can also be divided for every track width in the radial direction (track crossing direction). The track width tends to be narrowed as the recording density is increased.

As illustrated in FIG. 2, the postcodes 40 are recorded in every other storage regions 70 of each track in the circumferential (track) direction of the storage medium 10, and in every other track of each storage region 70 in the radial direction of the storage medium. In other words, the postcodes 40 are recorded spread apart in the circumferential direction of the storage medium 10 so that they are not provided adjacently. Therefore, the postcodes 40 are allocated in the shape of a lattice.

An interval for the postcodes 40 recorded in the radial direction of the storage medium 10 is set at least longer than the width of one track. In this manner, the margin of the postcodes 40 at the time of data recording and reproducing operations can be increased. Accordingly, the positioning accuracy of the magnetic head 20 can be improved. Therefore, it is possible to eliminate the problem in which the other data is erroneously overwritten to the adjacent data when the recording position of the magnetic head 20 is deviated, and the problem of data reproducing mistakes or reproducing errors generated when the reproducing position is deviated.

The region adjacent to the postcodes 40 in the radial direction is not used for writing user data even when this region is a blank portion or area 71. The reason is that if the data such as user data other than the postcode 40 is recorded in the blank portion 71, a part of the adjacent data becomes noise when the head position is fluctuated, resulting in a read error of the postcode 40, which is similar to the problem of the related art where the postcodes 40 are provided adjacently. As such, the accuracy of the positioning of the magnetic head 20 cannot be improved and it becomes difficult to realize high recording density of the storage medium. Thus, the region 70 is used for recording only the postcodes 40, and is continuous in the radial direction from the external to the internal circumferences of the storage medium 10.

The region 70 in this embodiment is provided adjacent to the servo frame 50. The blank portion 71 is the region in the region 70 which is not in a recording condition (for example, magnetizing condition is erased). The region 70 of each track has 24 bits in total including 16 bits for the postcode 40 and 8 bits for information indicating the start of the postcode.

Moreover, as the condition for allocating the postcodes 40 in the form of a lattice, it is required that individual correcting data for as many as two adjacent servo frames 50 be recorded in the track direction in a single postcode 40, as shown in FIG. 2. The two servo frames 50 corresponding to a single postcode are the two servo frames succeeding the servo frame where the postcode 40 is recorded. In this manner, the individual postcodes 40 are sufficiently isolated from each other, so that correcting signal can be calculated prior to the magnetic head 20 reaching the servo frame to be corrected and the magnetic head 20 is in the condition to always conduct the tracking operation while it is moving in the regions among the servo frames 50. Thus, it is possible to solve the problem of unstable write operation and data read error due to the fluctuations of the magnetic head 20.

In this embodiment, the correcting data up to two adjacent servo frames 50 on the same track is recorded in one postcode 40 in order to allocate the postcodes in the form of lattice. However, the correcting data corresponding to a plurality of servo frames 50, e.g., three or more, on the same track may be recorded to one postcode 40. In this case, the postcodes 40 are not allocated in the form of lattice and are allocated alternately or with deviation under the condition that the postcodes are isolated in every plural servo frames 50.

Since the correcting data corresponding respectively to a plurality of servo frames 50 are gathered and recorded in one postcode 40, the capacity used for the information indicating the start of the postcode can be reduced. This arrangement also minimizes the number of postcode regions 70, which reduces the recording capacity of the user data region.

Moreover, correcting the fluctuation of the magnetic head 20 in the data recording operation is simplified by using only the postcode 40 for recording to ensure stable data write operation of the recording element 21, and thereby preventing increase in the storage capacity used as the postcode region 70.

In regard to the positioning of the reproducing element 22 during the data write operation, the reproducing element 22 is set to the center of the track with the positioning control and the servo signal, and the postcode for recording is allocated at the center of track. Accordingly, the postcode for recording can be read with an ordinary tracking operation. Therefore, during the data recording operation, it is no longer required to position the reproducing element 22 with the particular control in order to read the postcode for recording, and stable data write operation can be realized with an ordinary tracking operation.

On the other hand, in regard to the positioning of the reproducing element 22 during a data reproducing operation, the positioning control of the reproducing element 22 is executed so that the MCU 110 controls the reproducing element of the magnetic head 20 to the track where data is written on the basis of the characteristic data of the magnetic head and control programs stored in the MCU memory 120.

Since only the postcodes for recording, but not for reproducing, are provided on a medium in this embodiment, an increase in the storage capacity used for the postcodes 40 can be prevented. Moreover, since the postcodes 40 for recording are allocated at the center of track, they can be read with an ordinary tracking operation and stable write operation can be realized without any particular control operation.

In some cases, a displacement of the reproducing element 22 generates a read error as in the case of the recording element 21. Error recovery is possible by repeating a trial read operation with the read retry process and while the read position is changed. Accordingly, the performance is lowered with the error recovery process, but it is also possible to eliminate the postcodes 40 for reproducing in the apparatus where importance is placed on the storage capacity of the user data region.

However, if a displacement is generated in the recording element 21, over-writing is conducted on the adjacent data with a higher possibility of the risk of disabling error recovery of the original adjacent data. Therefore, it is desirable for the apparatus in which the recording is conducted that the postcode 41 for recording be not eliminated. In the apparatus in which only the reproducing is conducted, it is enough when only the postcode for reproducing 40 is provided.

Figure 15:
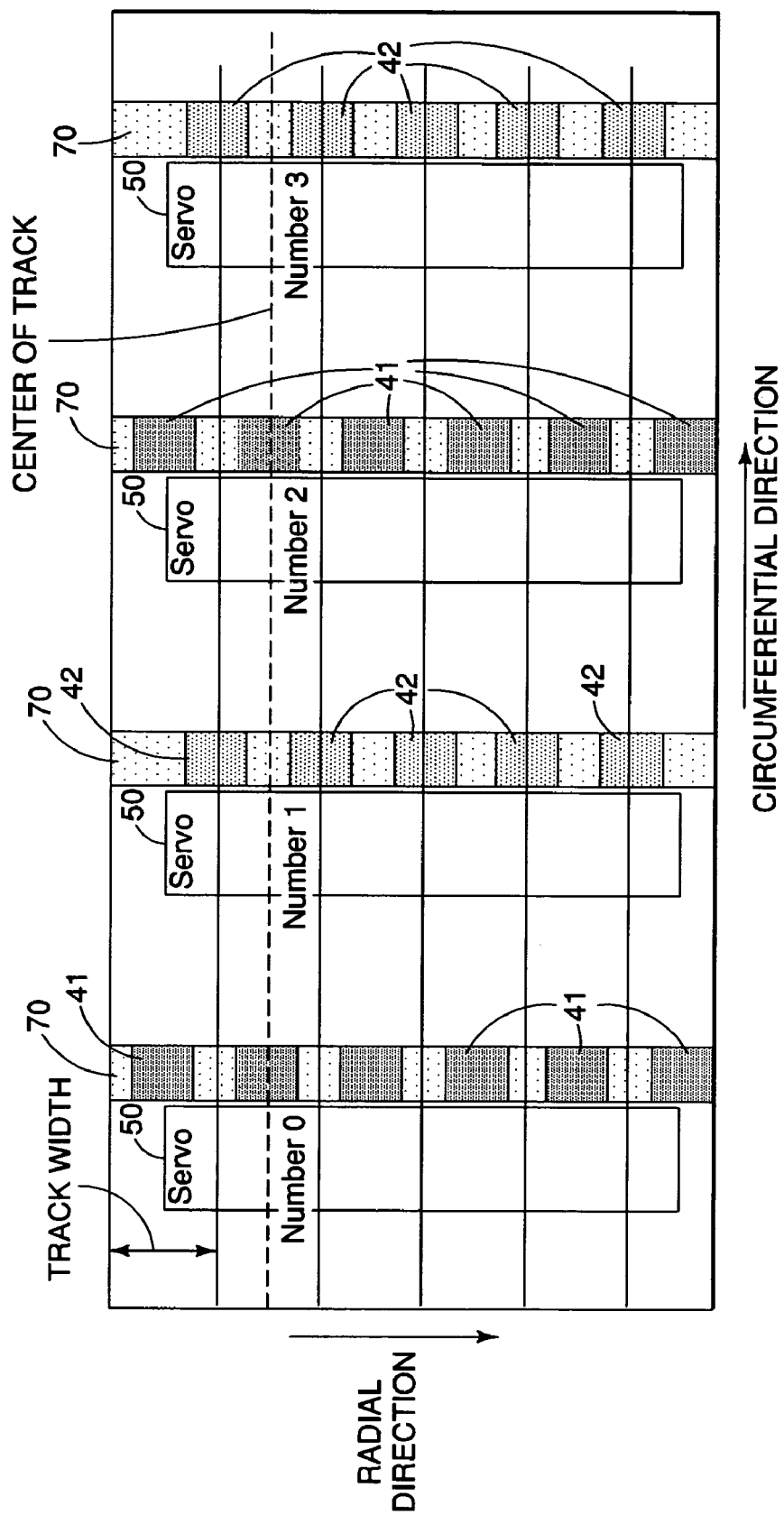
FIG. 15 is a diagram showing the allocation of postcodes according to a conventional method.
Figure 16:
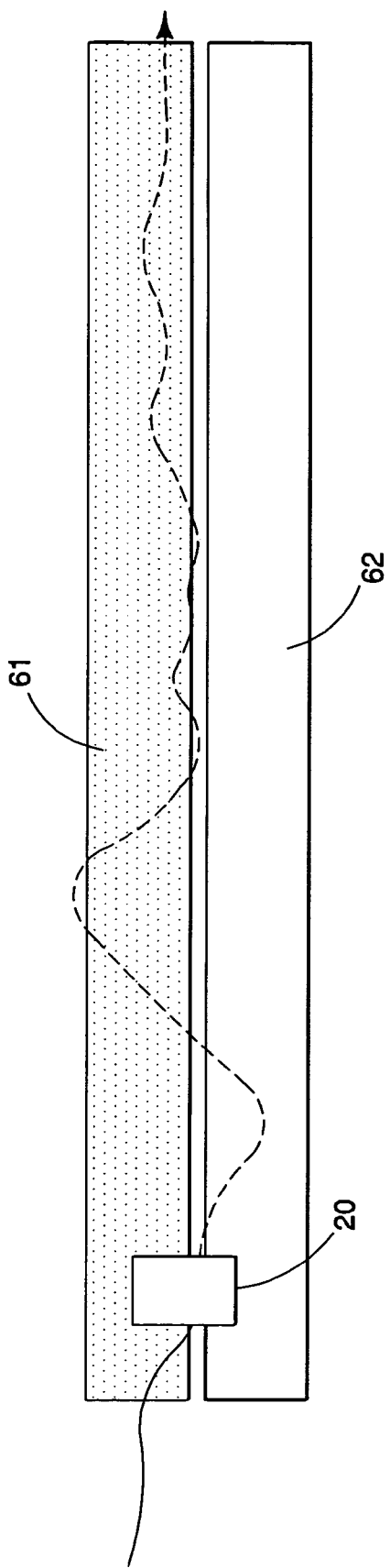
FIG. 16 is a diagram illustrating fluctuations being generated in the tracking of the magnetic head.

Accordingly, an allocation of only the postcode for recording 41 or reproducing 40 will enable allocation in the form of lattice with the recording capacity of the postcode region being same as that in FIG. 15. This is without an increase in a rate of the postcode region 70 for the total recording capacity of the storage medium, i.e., without a proportional reduction of the user data region.

Figure 3:
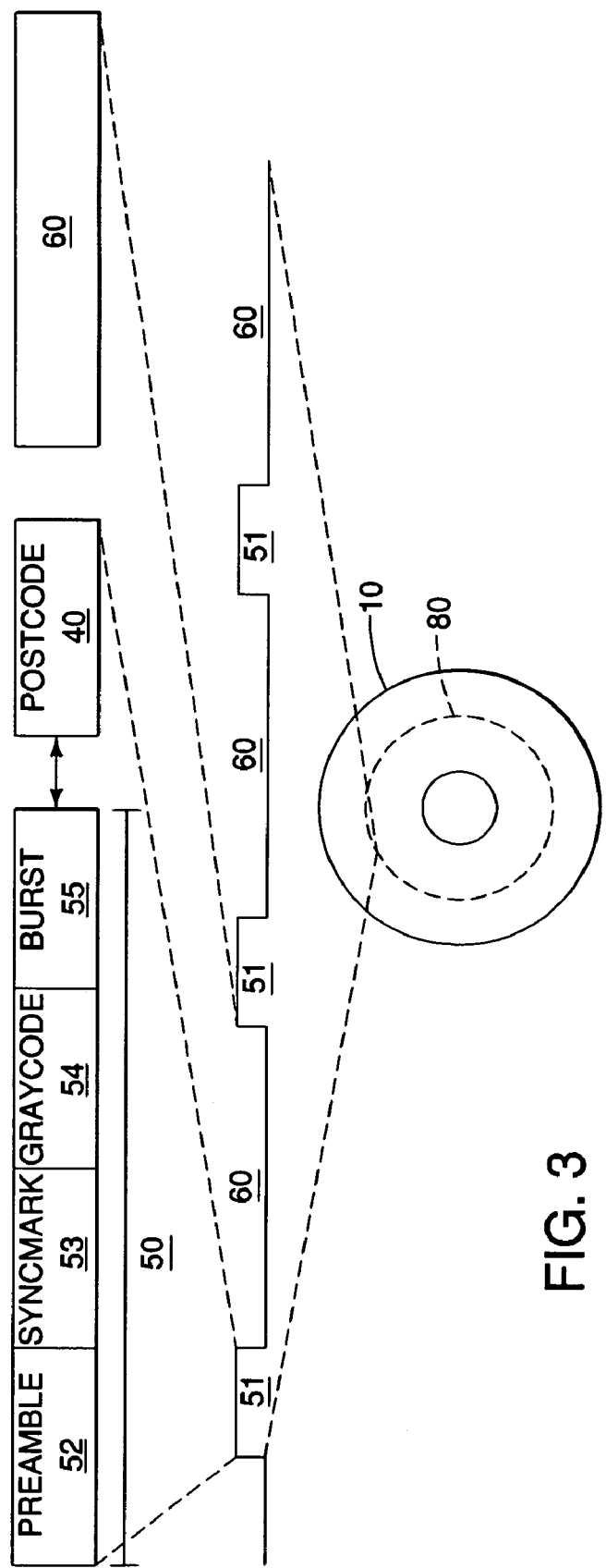
FIG. 3 is a diagram showing the contents of the tracks on a storage medium.

FIG. 3 is a diagram illustrating the allocation of the track in a particular cylinder 80 of the storage medium 10. The servo frame 50 is read with the magnetic head 20 during operation of disk drive. The rotation control of the disk type storage medium 10 and the position control of the magnetic head 20 mounted to an actuator on the disk type storage medium 10 are conducted by controlling the SPM 180 and the VCM 190 via the SVC 170 in the DSP 150 on the basis of the read position information. Seek control and tracking control are included in the position control of the magnetic head 20.

In FIG. 3, "PREAMBLE" 52 is a region for controlling the magnetic head 20 to follow the frequency, phase and amplitude of the servo waveform, and indicates the start of the region where the servo signal is recorded. "SYNCMARK" region 53 indicates the data starting position of the servo waveform. "GRAYCODE" region 54 is the information indicating to which head/track the position on the relevant track corresponds. The track number or the like is recorded with a numerical value during the STW process. The relative position between the center of track and present position where the head is located is recognized with the information written in the "BURST" region 55. In the "BURST" region 55, the analog data of the detail position information is written during the STW process in the amplitude system and phase system.

The servo signal of the servo frame 50 is recorded on the disk type storage medium 10 during the STW (servo track write) process. Moreover, "POSTCODE" region 40 is allocated after the servo frame 50 of the servo data unit 51. After the hard disk drive (HDD) is assembled into the apparatus body, the information for correcting position error not corrected completely with the servo information is recorded with a numerical value. For example, this information is recorded as the information to "deviate as much as 0.5 track in the internal circumferential direction", i.e., −0.5 to +0.5.

The correcting data of "POSTCODE" region 40 is written after assembling the HDD into the apparatus. Therefore, relationship between the servo waveform and the waveform of correcting data of the "POSTCODE" region 40 is not constant (a measuring error exists even when tuning is conducted with the apparatus), but the correcting data is written in the condition nearer to the servo data than the user data. For example, since the storage region between servo frames 50 becomes larger in the user data as it goes toward the external edge of the storage medium 10, such user data is written in higher density by increasing the frequency. On the other hand, the servo data is written with a constant frequency in the area extending to the internal edge from the external edge of the storage medium 10. The correcting data of the "POSTCODE" region 40 is written with a constant frequency as in the case of the servo data.

In another embodiment, correcting data is written similarly to that of user data in accordance with the hardware and firmware. The information within the servo frame 50 is written in the STW process and cannot be revised. The reason is that when the information in the servo frame 50 is once destroyed, the information in the servo frame cannot be restored without a repeated STW process. The STW process generally requires a certain time. Therefore, the problem of destroying the information in the servo frame 50 can be prevented by not allocating the "POSTCODE" region 40 within the servo frame 50, but in a user data region 60.

Figure 4:
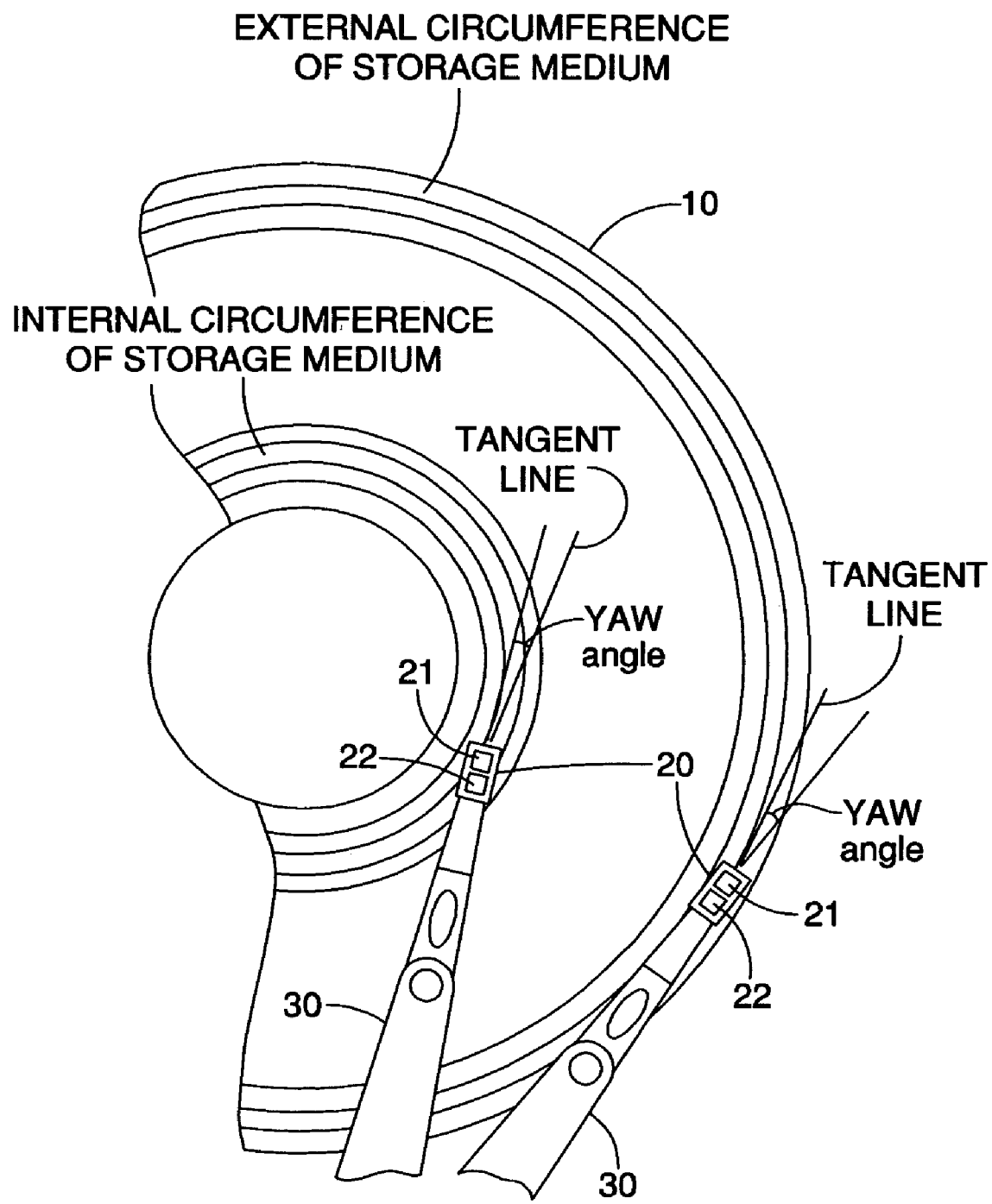
FIG. 4 is a diagram illustrating the concept of a YAW angle.

FIGS. 4 to 7 illustrate the positional relationship between the reproducing element 22 and the recording element 21 depending on the YAW angle at the magnetic head 20. FIG. 4 illustrates the concept of the YAW angle. In FIG. 4, many tracks are provided on the storage medium 10, but only several tracks in the external circumferential part and the internal circumferential part are shown for the convenience of explanation. The YAW angle is respectively generated between each track of the storage medium 10 and the magnetic head 20, and the locations of the reproducing element 22 and recording element 21 on the magnetic head generate deviation in the radius direction of the storage medium 10. Therefore, even when the reproducing element 22 is always located at the center of track, the reproducing element and recording element 21 may not always be in the same positional relationship.

Figure 5:
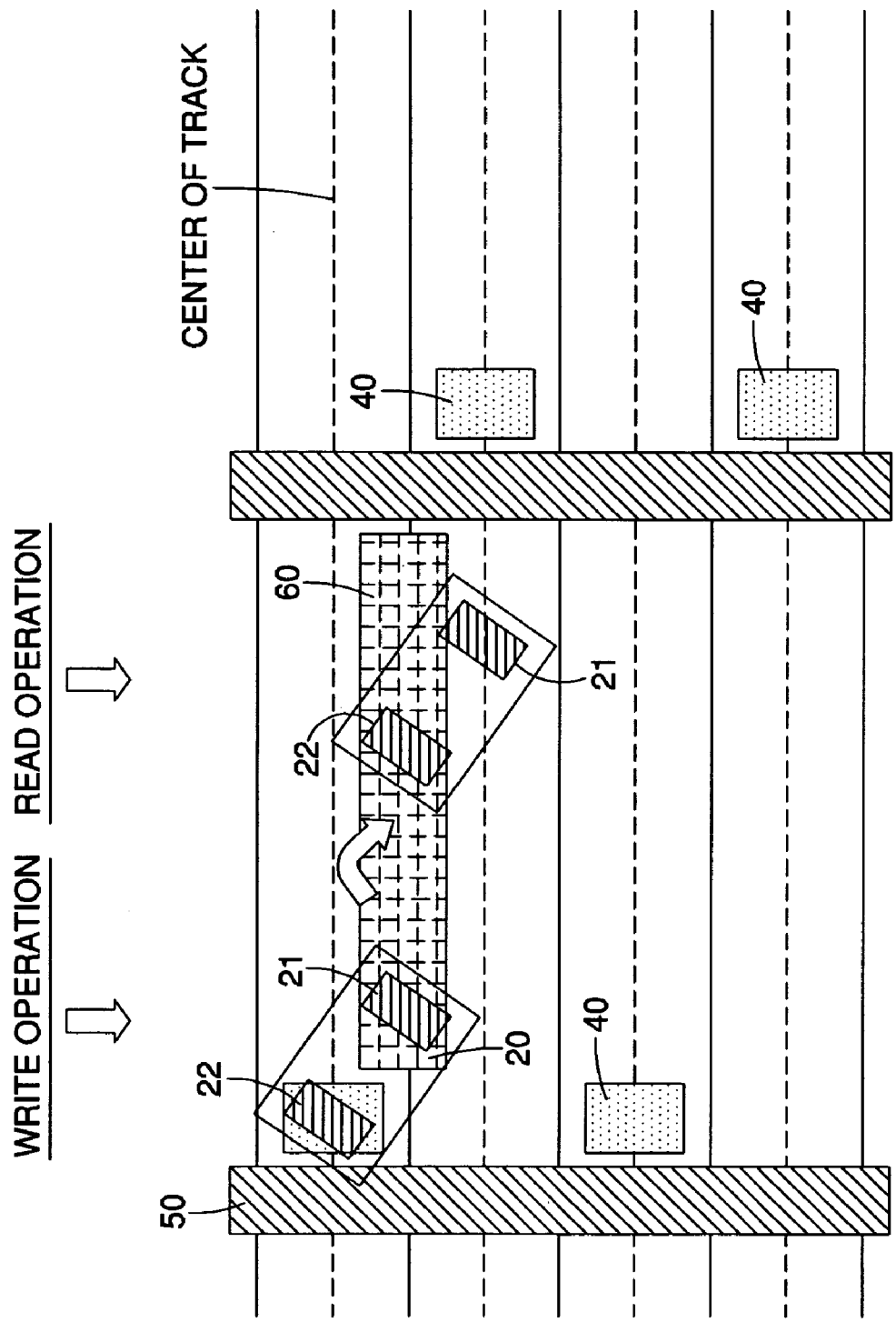
FIG. 5 is a diagram illustrating the positional relationship between a reproducing element and a recording element when the YAW angle is large.

FIG. 5 illustrates the relationship between the reproducing element 22 and recording element 21 when the YAW angle is large. When the YAW angle is large, the magnetic head 20 is placed on the track with a certain inclination to the circumferential direction of the track. Accordingly, the positions on the track of the reproducing element 22 and recording element 21 are deviated. During the write operation (write mode) of the user data region 60, the reproducing element 22 is placed on the center of the track to record the user data at the position of the recording element 21. During the read operation (read mode) of the user data region 60, the reproducing element 22 is placed on the position of track where the user data is recorded.

Figure 6:
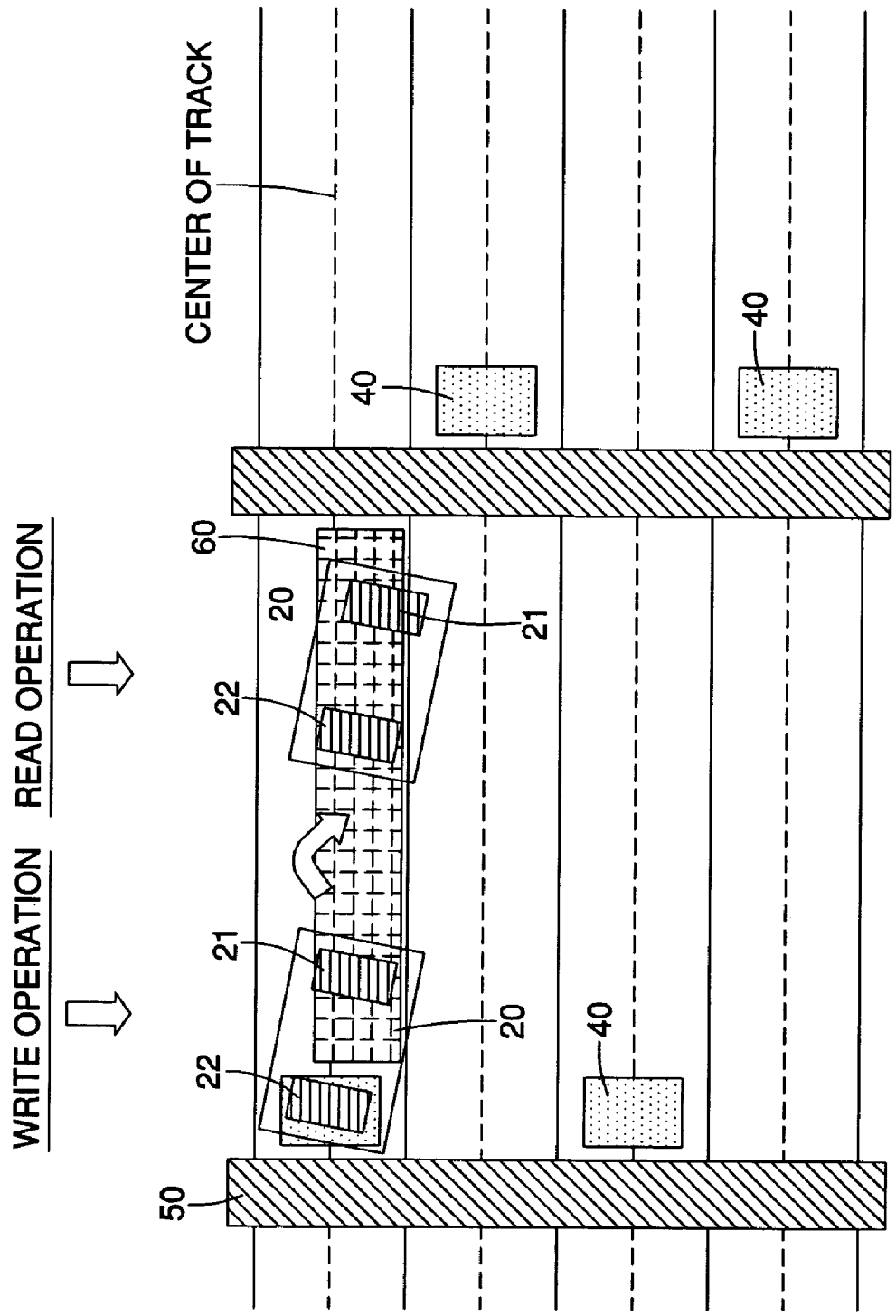
FIG. 6 is a diagram illustrating the positional relationship between the reproducing element and the recording element when the YAW angle is small.

FIG. 6 illustrates the positional relationship between the reproducing element 22 and recording element 21 when the YAW angle is small. When the YAW angle is smaller, the magnetic head 20 is placed on the track under the condition in which the magnetic head becomes almost parallel to the circumferential direction of the track. In the writing operation (write mode) of the user data region 60, the reproducing element 22 is placed at the center of the track to record the user data at the position of the recording element 21. In the reading operation (read mode) of the user data region 60, the reproducing element 22 is placed on the position where the user data is recorded.

As explained above, since the YAW angle is different in the external edge side and the internal edge side of the disk type storage medium 10, the positional relationship between the reproducing element 22 and recording element 21 also changes in accordance with such difference.

Accordingly, when the YAW angle is generated, the position where data is actually written is deviated from the center of the track because the reproducing element 22 is located at the center of the track during the write operation. On the occasion of reproducing written data, the reproducing element 22 is moved to the position where the data is written. When the YAW angle is not generated, data is written on the same line as the center position of the track.

The YAW angle as used here refers to an inclination of the magnetic head 20 relative to the circumferential direction of storage medium 10 (tangent direction). In FIG. 4, the magnetic head 20 is shown being positioned at the external edge part and the internal edge part of the storage medium 10. With reference to the tangent (positive tangent) of the track, inclination of the magnetic head 20 becomes a positive angle in the internal edge side, while it becomes a negative angle in the external edge side.

Figure 7:
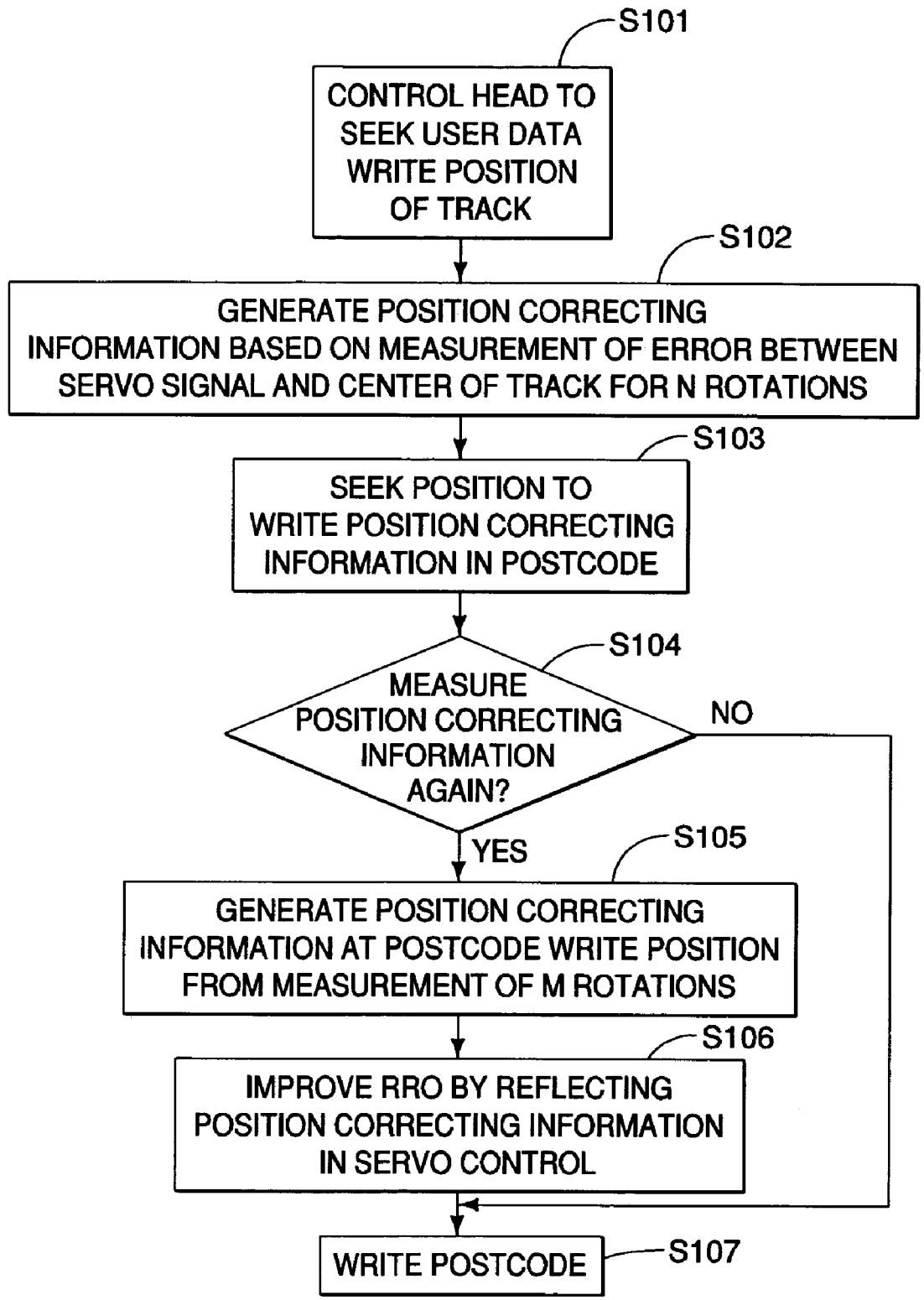
FIG. 7 is a flowchart describing the sequence for writing the postcode for recording.

FIG. 7 is a flowchart describing a postcode 40 write sequence. First, the magnetic head 20 is controlled to seek the position where the recording element 21 can improve the positioning accuracy (write position of user data of the correct track)(S101). The magnetic head 20 in this embodiment decides the user data write position of the recording element 21. This is on the basis of the condition of the YAW angles of the reproducing element 22 and recording element 21 when the reproducing element 22 is located at the center of track, because the reproducing element 22 is set to locate at the center of track. An error generated between the position information in the servo signal recorded during the STW process and the center of the track is measured for N rotations using the reproducing element 22 by setting the center of the track as the target position. Thus, the position correcting information is generated on the basis of the result of measurements (S102).

Next, the magnetic head 20 is controlled to seek the position to write the position correcting information as the postcode 40. This position is where the position correcting information can be read by the reproducing element 22 under the condition that the recording element 21 is located at the position for improving the positioning accuracy (user data writing position)(S103). That is, since the user data is written in this embodiment under the condition that the reproducing element 22 of magnetic head 20 is located at the center of the track, the seek operation is performed to locate the recording element 21 to the center of the measured track in order to write the postcode 40 to the center position of the track.

Whether the position correcting information should be measured is selected again under the condition that the recording element 21 is located at the center of track (S104). When the repeated measurement of the correcting position information is not required, the postcode 40 is written to complete the process to the region for postcode of track where the recording element 21 is located (S107).

On the other hand, in the case where the correcting position information is measured again under the condition that the recording element 21 is located at the center of track (in the case of improving also the positioning accuracy of the recording element 21 at the time of writing the postcode 40), the position correcting information for further improving the center position of the track to the shape nearer to the true circle is generated through measurement of M rotations (S105). In view of improving RRO (Rotational Run Out), which is a constant fluctuation generated repeatedly, i.e., in order to further improve the positioning accuracy of the magnetic head 20, the position correcting information is reflected in servo control (S106). The postcode 40 is written to complete the process to the region of the track where the recording element 21 is located (S107).

In regard to the control for writing of postcode 40 in the embodiment of the present invention, the rotation control of the disk type storage medium 10 and positioning of the magnetic head 20 mounted to an actuator are performed by controlling SPM 180 and VCM 190 via SVC 170 with DSP 150 on the basis of the write pattern stored in the MCU MEMORY 120. For the postcode 40 to be written, the data signal modulated with the RDC 130 is transmitted to the HDIC 140 and is recorded with the DSP 150 to the position where the magnetic head 20 is positioned.

A postcode write pattern is now explained. When the postcode is allocated to the region corresponding to the servo number [2m−2] (even number) in the [2n−1]th (odd number) track, the region for allocating the postcode at the [2n]th (even number) track corresponds to the servo number [2m−1](odd number).

When the postcode is allocated to the region corresponding to the servo number [2m−1](odd number) in the [2n−1]th (odd number) track, the region for allocating the postcode 40 in the [2n]th (even number) track corresponds to the servo number [2m] (even number).

When the postcode write pattern is deviated in every three servo frames 50, for example, if the postcode 40 is allocated to the region corresponding to the servo number [3m−3] in the [3n−2]th track, the region for allocating the postcode in the [3n−1]th track corresponds to the servo number [3m−2], and the region for allocating the postcode in the [3n]th track corresponds to the servo number [3m−1].

When the postcode 40 is allocated in the region corresponding to the servo number [3m−2] in the [3n−2]th track, the region for allocating the postcode in the [3n−1]th track corresponds to the servo number [3m−1], and the region for allocating the postcode in the [3n]th track corresponds to the servo number [3m].

Moreover, when the postcode 40 is allocated to the region corresponding to the servo number [3m−1] in the [3n−2]th track, the region for allocating the postcode in the [3n−1]th track corresponds to the servo number [3m], and the region for allocating the postcode in the [3n]th track corresponds to the servo number [3m+1].

When the postcode write pattern is increasingly deviated in every several servo frames 50, the write pattern is also changed in the same manner. Here, it is assumed that n is 1, 2, ..., x, and m is 1, 2, ..., y, where x and y are different in accordance with a medium. Therefore, x and y can take the desired values.

In this embodiment of the present invention, the postcodes 40 are allocated in the form of lattice. However, the servo data area 51 (best shown in FIG. 3) for writing the postcode 40 is not particularly restricted and the postcode can be recorded in the desired region of servo data area 51.

Figure 8:
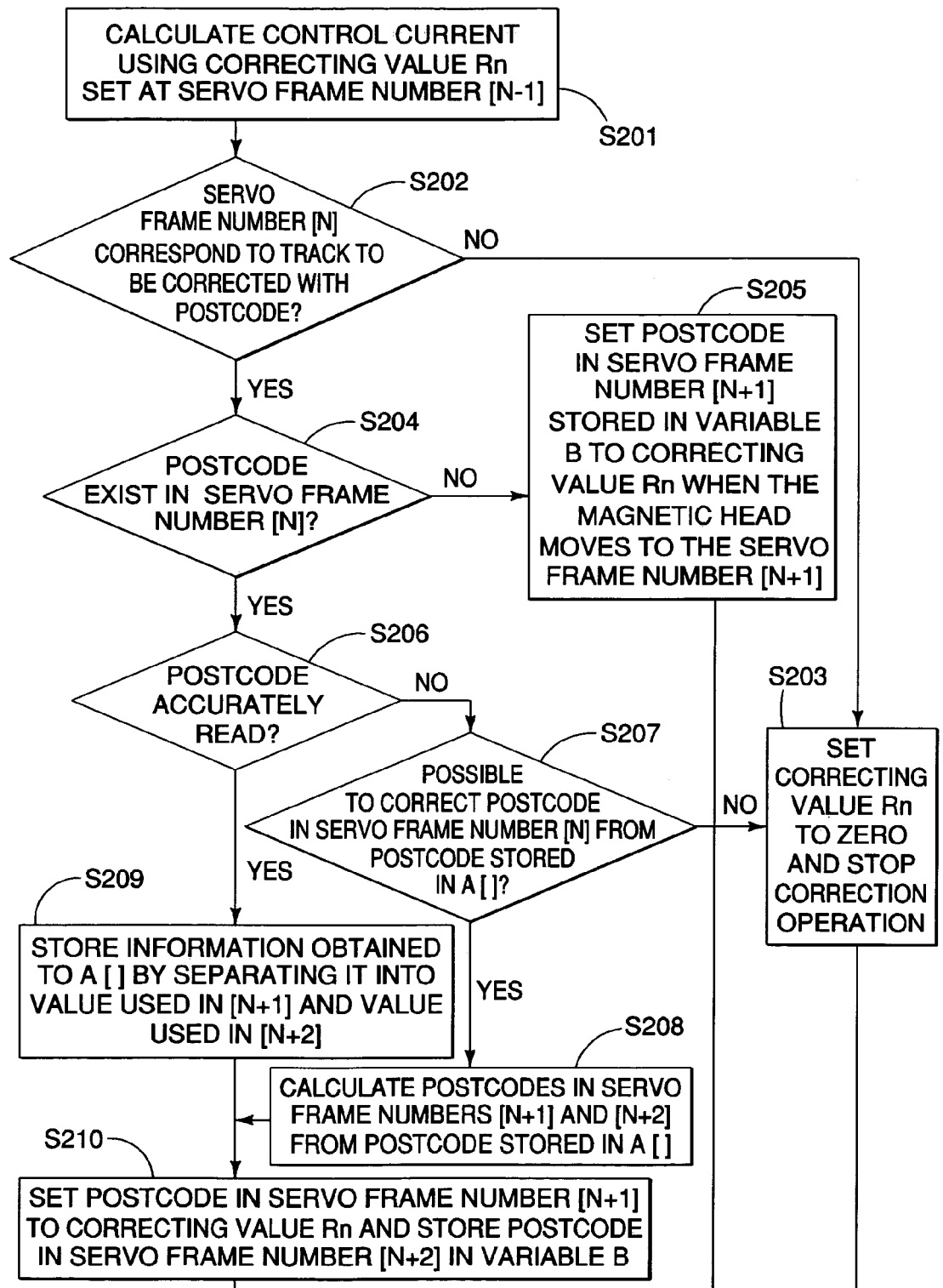
FIG. 8 is a flowchart describing the postcode setting process.

The details of the position correcting control based on the postcode 40 to be processed with the information storage apparatus 1 of the present invention is now explained. FIG. 8 is a flowchart describing the postcode setting process in the servo frame number [N]. In the storing region of the MCU memory 120 for storing the postcodes, arrangement A[ ] for storing the correcting data of the postcode 40 of one rotation and variable B for storing the postcode used in the servo frame 50 after two frames are provided.

First, a control current flowing into the VCM 190 is calculated using a correcting value Rn which is set with the servo frame number [N−1] one frame before the servo frame number [N] (S201). Next, whether the servo frame number [N] corresponds to the track to be corrected with the postcode 40 is decided (S202). When the servo frame number [N] does not correspond to the track to be corrected with the postcode 40, the correcting value Rn is set to zero, and the correcting operation is not performed (S203). However, when the servo frame number [N] corresponds to the track to be corrected with the postcode 40, whether the postcode exists in the servo frame number [N] is decided (S204). When the postcode 40 does not exist in the servo frame number [N], the postcode stored in the variable B in the servo frame number [N−1] is set to the correcting value Rn (S205). In this case, the postcode 40 exists in the servo frame number [N−1] and this postcode has been separated into individual postcodes of the servo frame number [N] and servo frame number [N+1]. After two servo frames have been separated into the postcodes, since the postcode stored in the variable B is used for the servo frame number [N+1], the postcode stored in the variable B is set to the correcting value Rn when the magnetic head moves to the servo frame number [N+1].

On the other hand, when the postcode 40 exists in the servo frame number [N], the postcode 40 of the servo frame number [N−2], two frames before the servo frame number [N], is separated into two individual postcodes and the magnetic head 20 of the servo frame number [N] is corrected in the position thereof with the postcode stored in the variable B. The correcting values Rn in the servo frame number [N+1] to which the magnetic head 20 moves next and the servo frame number [N+2] to which the magnetic head 20 moves thereafter are set on the basis of the postcode 40 allocated in the servo frame number [N]. Therefore, whether the postcode 40 in the servo frame number [N] has been acquired accurately is decided (S206).

When the postcode 40 in the servo frame number [N] cannot be acquired accurately, whether this postcode 40 may be corrected is decided from a postcode 40 read in the past and stored in the arrangement A[ ] at the time of correcting the position in the track (S207).

When correction is not possible, the correcting value Rn is set to zero and correction is not conducted (S203). On the other hand, when correction is possible, the postcodes used in the servo frame number [N+1] and the servo frame number [N+2] are calculated from the stored value A[ ] of the postcode 40 in the past (S208). The postcode used in the servo frame number [N+1] is set to the correcting value Rn, while the postcode used in the servo frame number [N+2] is stored in the variable B (S210).

When the postcode 40 in the servo frame number [N] has been acquired accurately, the postcode 40 is isolated to the postcode using the position correcting information obtained in the servo frame number [N+1] and the postcode using the same position correcting information in the servo frame number [N+2] and then stored in the arrangement A[ ]. Since longer time is required for this isolation process, the postcodes for adjacent two servo frames are recorded in one postcode 40 and the isolated postcodes are used for the servo frame after one frame and the servo frame after two frames. In this manner, when the magnetic head arrives at the servo frame to be corrected, the magnetic head 20 can immediately be subjected to the correction of position. After the postcode has been isolated into the postcode of each servo frame, the postcode used in the servo frame number [N+1] is set to the correcting value Rn, while the postcode used in the servo frame number [N+2] is stored to the variable B (S210).

As explained above, the preset postcode 40 is used in the next servo frame and the subsequent frames in the region where the postcode 40 is allocated. Thus, the postcode 40 is not restricted to the allocation just after the servo frame when the condition that the position can be corrected immediately after the magnetic head 20 arrives at the servo frame to be corrected is satisfied. The postcode 40 in this embodiment of the present invention is allocated immediately after each servo frame, but the postcode can also be allocated in other regions in other embodiments.

Figure 9:
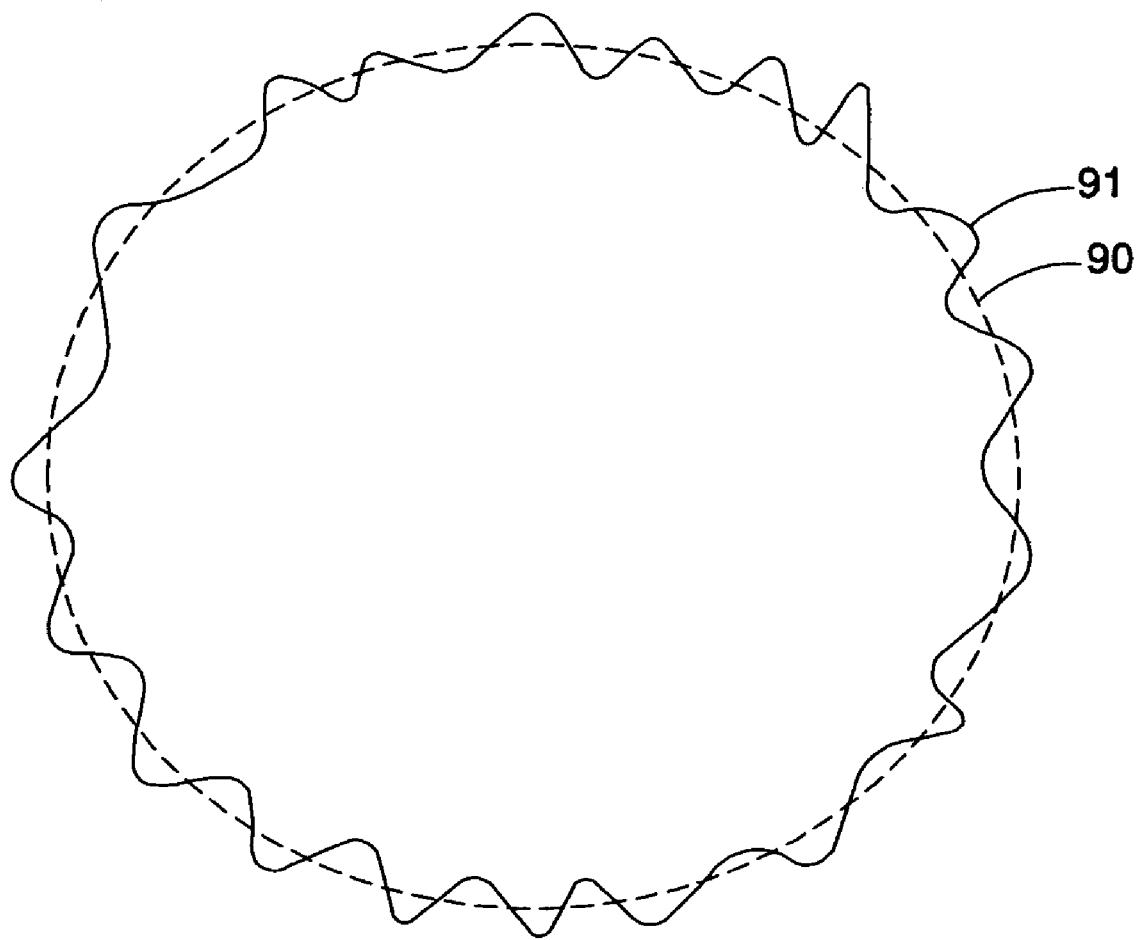
FIG. 9 is a diagram illustrating the relationship between the fluctuation in the VCM and the demodulating position.

FIG. 9 is a diagram illustrating the relationship between the fluctuation of the VCM 190 and the demodulating position. Numeral 90 denotes the demodulating position (ideal locus of the magnetic head) and numeral 91, the fluctuation of the VCM (actual locus of fluctuation of the magnetic head).

For high density recording of data to the storage medium 10, it is ideal that the center of the track be similar to the shape nearer to the true circle and each track be allocated concentrically (indicated by a broken line). However, constant fluctuation called the RRO (Rotational Run Out) 91 is generated at the actual center of track.

Figure 10:
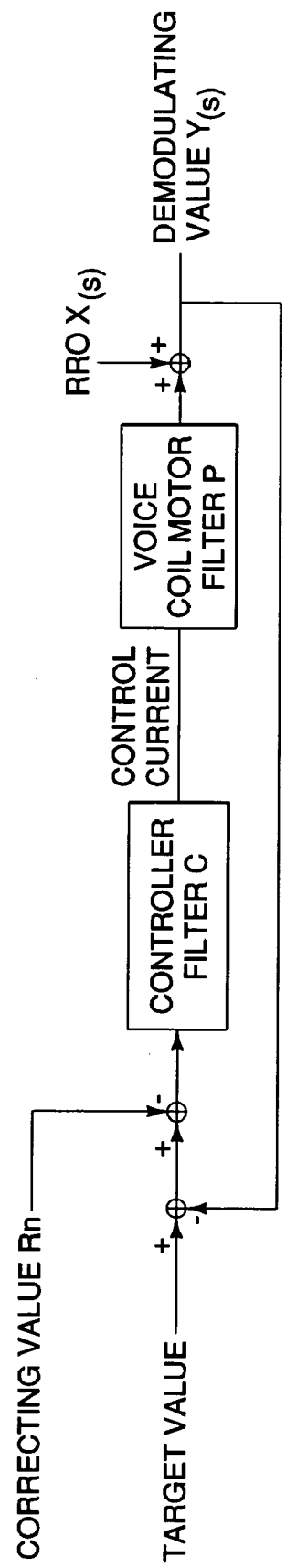
FIG. 10 is a block diagram of the control part of a VCM in the storage apparatus of the present invention.

FIG. 10 is a control block diagram illustrating an outline of the control of the VCM 190 for correcting the position of the magnetic head 20 using the separated postcodes 40. In FIG. 10, the deviation (positional error) between the target position (center position of the track in this embodiment) and the actual position of the magnetic head 20 is obtained and correcting value Rn is obtained from the deviation. Here, individual postcode separated from the postcode 40 is provided for the correcting value Rn. A controller filter C calculates the control current in the amount to be corrected and a voice coil motor filter P corrects the position of the magnetic head 20. The magnetic head position after this correction is fed back again to obtain the deviation from the target position (center position of track). Here, the control current for setting this deviation to zero is obtained in order to control the VCM 190.

The demodulated position information is formed of the data of RRO with inclusion of constant filter characteristic and is called the rotational position error (RPE). When it is requested to generate the postcode, the RRO is obtained by measuring this RPE and using the inverse characteristic of the sensitivity function.

Here, the method for obtaining the RRO will be explained. The transfer function (sensitivity function) up to the RPE from the RRO is expressed as follows.

$$X_{(s)} - PCY_{(s)} = Y_{(s)} (X_{(s)}: \text{input}, Y_{(s)}: \text{output}) \ (1+PC) Y_{(s)} = X_{(s)} Y_{(s)}/X_{(s)} = 1/(1+PC) \quad (1)$$

Therefore, the RRO can be obtained from the RPE by multiplying the inverse characteristic (1+PC) thereto. The RPE generated from the RRO can be reduced by correcting the target position using the RRO obtained above and setting the target position to the shape nearer to the true circle.

As explained above, in one embodiment of the present invention, the postcodes 40 are allocated in the form of a lattice with inclusion of deviation, and gaps are provided among the postcodes allocated adjacently in the radial direction of the storage medium 10. Accordingly, it is possible to prevent the problem of read error being generated by reading the adjacent postcodes 40 of one to several tracks as noise, and overwriting on the adjacent postcodes at the time of writing the postcodes. In this manner, the postcodes 40 can be reproduced with higher accuracy. Moreover, in the embodiment of the present invention, the postcodes 40 are formed of only the postcodes 41 for recording. Accordingly, the region for providing the interval to the postcode allocated adjacently in the radial direction of the storage medium 10 can be acquired without a reduction of the storage capacity of the user data region.

Figure 11:
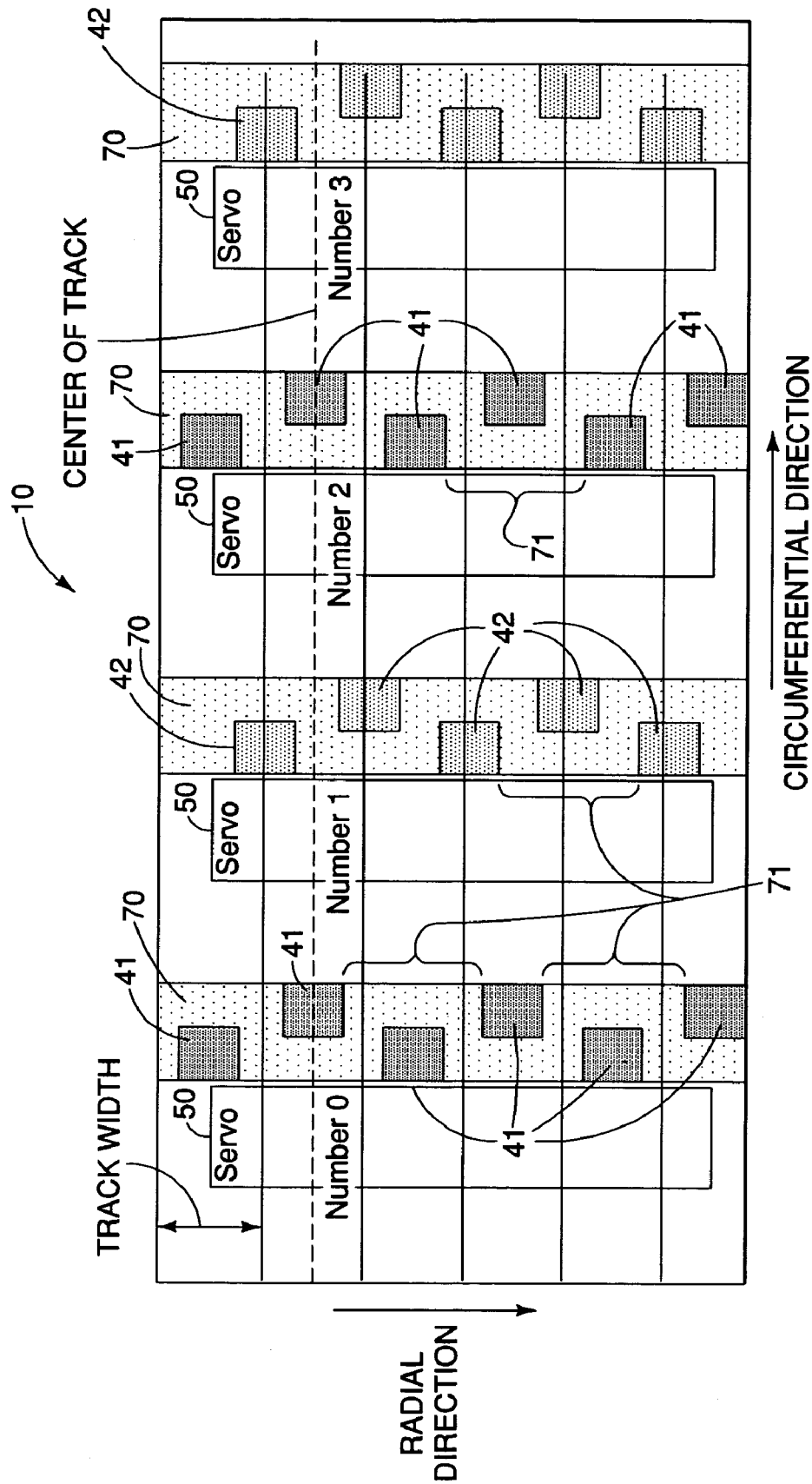
FIG. 11 is a diagram illustrating the allocation of postcodes on a recording medium in accordance with another embodiment of the present invention.

FIG. 11 illustrates another embodiment of the present invention for allocating postcodes in each track of the storage medium 10. The structures that are similar to those of the first embodiment are not discussed in detail. In FIG. 11, the postcodes 41 for recording, and postcodes 42 for reproducing are allocated in different recording regions immediately after the servo frame 50. The servo frame 50 is recorded in the radial direction from the center of disk 10 and the data for controlling the position of the magnetic head 20 is recorded thereto. In the recording region of the disk type storage medium 10, servo data can be reproduced in a predetermined interval in the circumferential direction and is divided in every track width in the radial direction. The track width tends to become narrower as the recording density is increased.

As illustrated in FIG. 11, the postcode 41 for recording and the postcode 42 for reproducing are alternately allocated after every servo frame 50 within the postcode regions 70, and the adjacent postcodes 41 or 42 within the same postcode region are shifted forward or backward with respect to each other in the circumferential direction within the boundary of the postcode regions 70.

As explained above, in the adjacent tracks, the postcodes 41, 42 within the same postcode region 70 are shifted forward and backward as much as data capacity of the postcode in the circumferential direction. In this manner, a blank area 71 is formed between two postcodes within the same postcode region 70 and are aligned in the radial direction. The postcodes 41, 42 are allocated so that the magnetic head 20 does not read a part of the adjacent postcodes and does not overwrite the data on the adjacent postcodes. Accordingly, postcode read error can be eliminated and positioning accuracy of magnetic head 20 can be improved. Therefore, the problems of data being erroneously overwritten on the adjacent data when the recording position of magnetic head 20 is deviated and data reproducing mistake or data reproducing error being generated when the reproducing position is deviated can be eliminated.

The user data or the like is not written on the blank area 71 adjacent the postcode 41, 42 in the radial direction of the magnetic disk 10. If data other than postcodes such as user data is recorded in the blank area 71, the recording capacity can be increased. However, the problem similar to the related art where the postcodes are allocated adjacently would also be generated. Namely, a part of the adjacent data would be detected as noise, resulting in a read error for the postcode when the head position is fluctuated. In the postcode region 70 of this embodiment, 24 bits are required because 16 bits are required for correcting data and 8 bits for the information indicating the start of the postcode for one postcode.

In this invention, the correcting data of individual postcodes 41 or 42 for adjacent two servo frames 50 in the track (circumferential) direction on the same track is included in one postcode. Two servo frames 50 corresponding to each postcode are allocated two frames after the servo frame where the relevant postcode is allocated. The reason is that the magnetic head 20 must be positioned immediately after it moves on the tracks and arrives at the servo frame 50 to be corrected by previously isolating the individual postcodes of each servo frame from the postcode and also calculating the correcting signal. Therefore, the magnetic head 20 is always in the tracking condition while it is moving on the regions among servo frames 50. In this manner, the problems of unstable writing and data reading error due to fluctuation of the magnetic head 20 can be eliminated. Moreover, with the structure explained above, the correcting data can be processed in such a stage as waiting for the rotation before the positioning to the target servo frame and thereby high speed positioning can be realized.

In the examples described above, the correcting data of individual postcodes for two adjacent servo frames in the track direction of the same track are included in common in one postcode. However, correcting data of a plurality of individual postcodes may be included in one postcode. In this case, the regions exist among the servo frames 50 where the postcode 41 for recording and the postcode 42 for reproducing are not allocated alternately in every servo frame 50 and both postcode 41 for recording and the postcode 42 for reproducing are not allocated at all.

Moreover, since the correcting data corresponding respectively to a plurality of servo frames 50 are recorded to only one postcode, the capacity used for the information indicating start of the postcode can be reduced and the postcodes can be allocated in the form of a lattice without remarkable increase of the rate occupied with the recording capacity of the postcode region in the entire area of the storage medium.

In the case where the correcting data of three or more postcodes are allocated in the postcode regions 70 among the servo frames 50, the recording capacity of the user data region is reduced only with increase in the blank area 71 of the postcode region. Therefore, it is also possible to employ such allocation in the product aimed at improvement in the recording capacity of the user data region.

Figure 12:
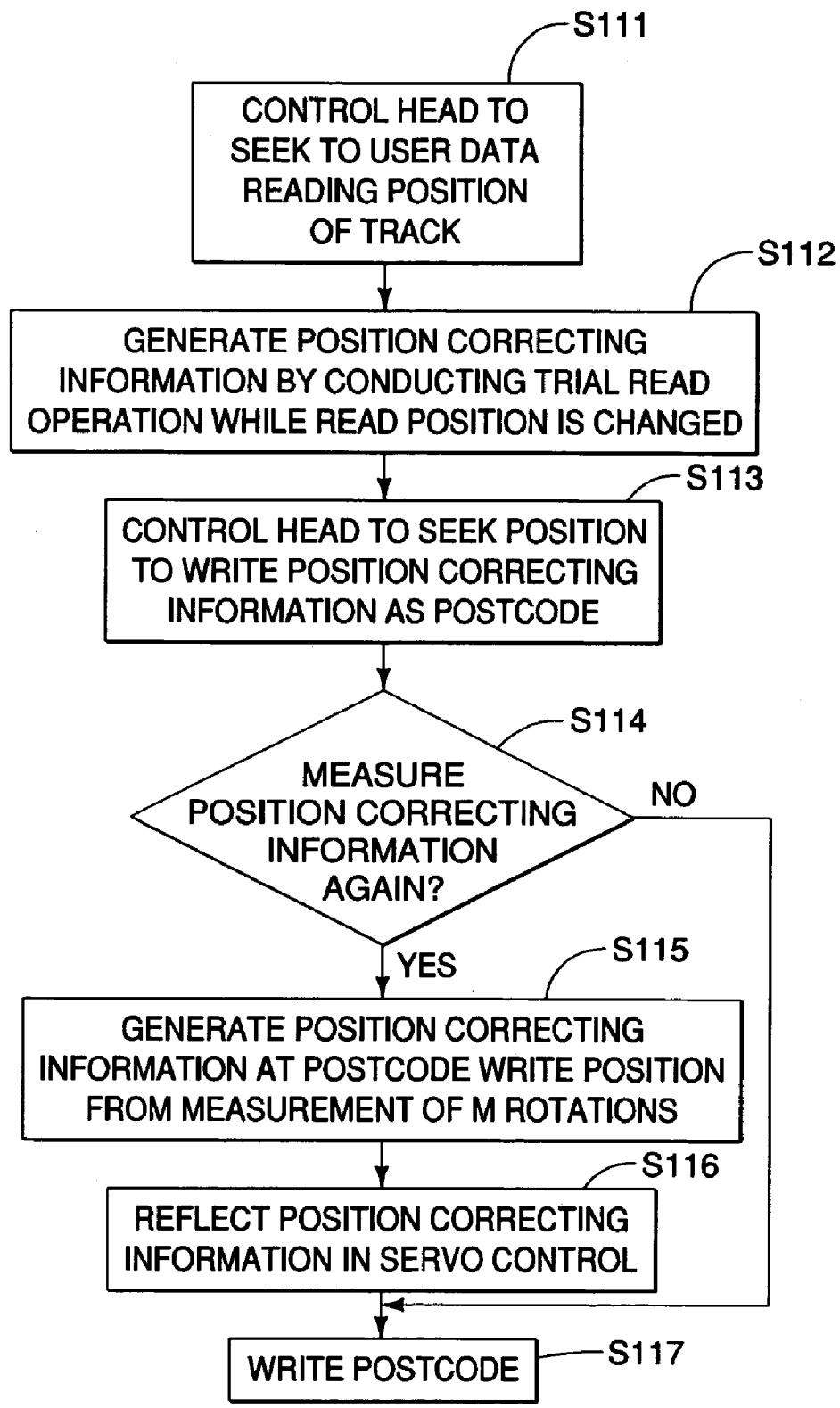
FIG. 12 is a flowchart describing the sequence for writing the postcode for reproducing.

FIG. 12 is a flowchart of a sequence for writing the postcode 42 for reproducing in the second embodiment of the present invention. First, the magnetic head 20 is controlled to locate the reproducing element 22 to the position for improving the positioning accuracy (user data reading position of the correcting track) (S111). Measurement of the correcting information is conducted through N rotations of the storage medium 10 by conducting a trial read operation while the read position is changed. Thereafter, the position correcting information is generated on the basis of the result of measurement (S112).

Next, the magnetic head 20 is then controlled to seek a position to write the position correcting information as the postcode to the position to read also the postcode 42 for reproducing with the ordinary read operation (on the track where the user data is written) (S113). Here, the recording element 21 is controlled to seek the track where the user data is written. Since the magnetic head 20 in this embodiment is set to locate the reproducing element 22 at the center of track, it is also possible, in this step, to control the reproducing element to be located at the center of track because of the process that the user data is written in the condition that the reproducing element 22 is located at the center of track.

Next, whether the correcting position information should be measured again is selected under the condition that the recording element 21 is located on the track where the user data is written (S114). When the position correcting information is not measured again, the process is completed with the writing of the postcode 42 for reproducing to the position where the recording element 21 is located S117). In this case, position may be corrected using the direct result of the measurement at the time of writing the postcode 41 for recording illustrated in FIG. 7.

The correcting position information is measured again under the condition that the recording element 21 is located on the track where the user data is written, i.e., when it is required to improve also the positioning accuracy of the recording element 21 at the time of writing the postcode 42 for reproducing. The position correcting information is generated from measurement of M rotations (S115), and the result of measurement is reflected on the servo control in order improve the positioning accuracy of the magnetic head 20 (S116). Thereafter, the postcode 42 for reproducing is written to the position to which the recording element 21 is located (S117).

Figure 13:
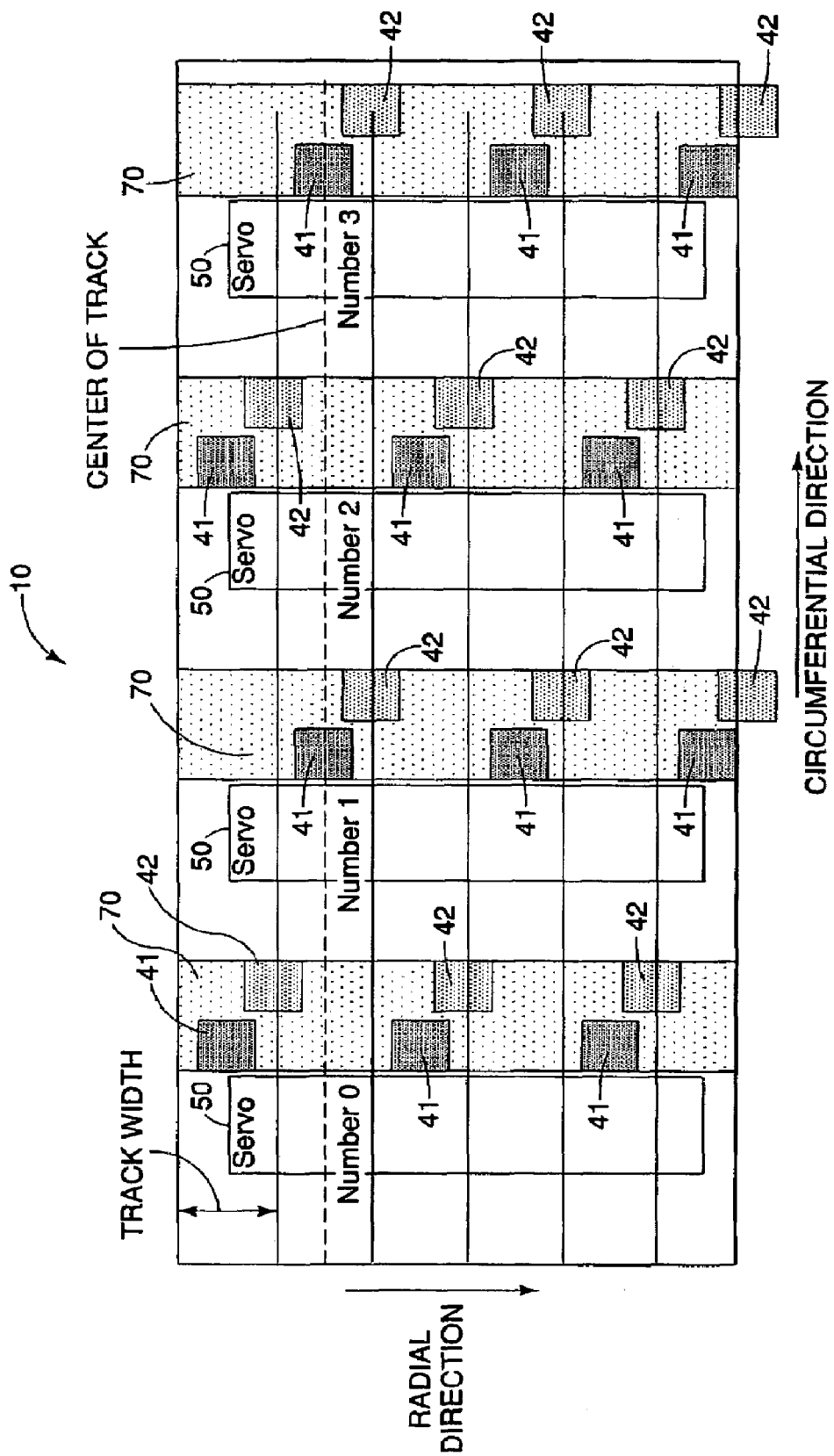
FIG. 13 is a diagram illustrating the allocation of postcodes on a recording medium in accordance with yet another embodiment of the present invention.

FIG. 13 illustrates an example of postcode allocation where the YAW angle of the storage medium 10 is generated. In FIG. 13, the postcodes 41 for recording and the postcode 42 for reproducing are allocated in the storage regions 70 immediately after the servo frames 50. The servo frames 50 are recorded in the radial direction and data is recorded thereon for the position control of the magnetic head 20. Servo data can be reproduced in a predetermined interval in the circumferential direction from the storage regions of the disk type storage medium 10. The servo data is divided to the widths of the corresponding tracks in the radius direction. The track widths tend to become narrower as the recording density is increased.

As illustrated, the postcode 42 for reproducing is allocated substantially continuously after the postcode 41 for recording within the region 70 for postcodes. Namely, a series of a servo frame 50, a postcode 41 for recording and a postcode 42 for reproducing are allocated as one combination. After the postcodes 41 for recording are allocated in the form of a lattice as illustrated in FIG. 2, the postcodes 42 for reproducing are added to correct the user data reading position in view of improving the positioning accuracy of the magnetic head at the time of reading data.

Figure 14:
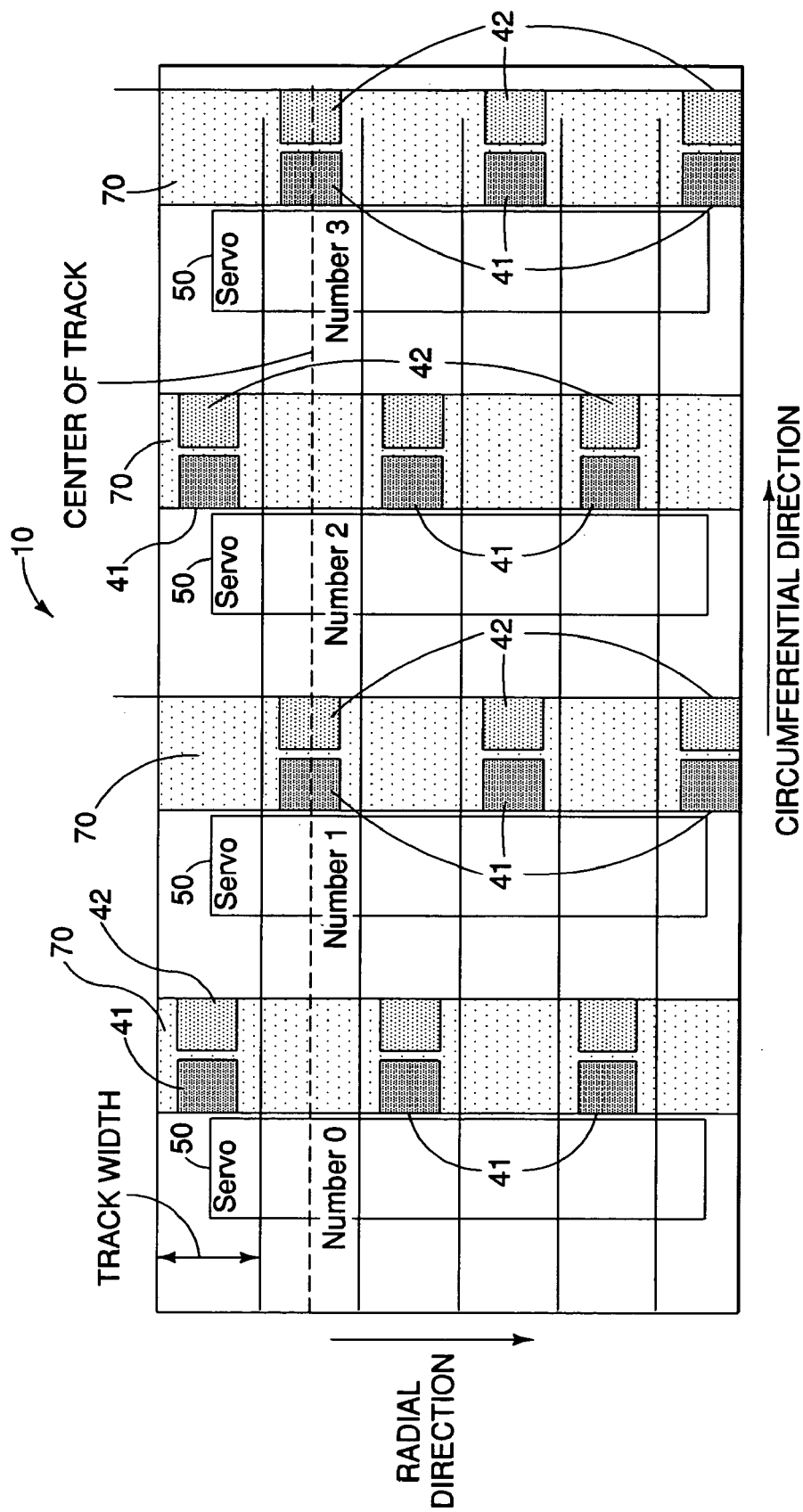
FIG. 14 is a diagram illustrating the allocation of postcodes on a recording medium in accordance with further embodiment of the present invention.

FIG. 14 illustrates an example of postcode allocation where the YAW angle of storage medium is not generated. In FIG. 13, the postcode 41 for recording and the postcode 42 for reproducing are allocated with deviation between these postcodes in the radial direction of the storage medium 10. However, in FIG. 14, the postcode 41 for recording and the postcode 42 for reproducing are allocated parallel in the circumferential direction (longitudinal direction of track) of the storage medium 10. As explained above, for the postcode 42 for reproducing, the recording positions on the track are different in accordance with the YAW angle.

In FIG. 13 and FIG. 14, several bits are provided between the postcode 41 for recording and the postcode 42 for reproducing. However, in the other embodiments, it is also possible to employ the structure such that no blank area is provided or a larger blank area is provided between the postcodes 41 and 42. In the postcode storage region 70, 16 bits for correcting data and 8 bits for information indicating start of postcode are required for one postcode.

As explained above, the postcode 42 for reproducing to correct the user data reading position is additionally allocated within the same postcode region 70 after the postcode 41 for recording. Therefore, a highly accurate positioning of the magnetic head 20 can be realized not only in the data recording operation but also in the data reproducing operation. Moreover, the magnetic head 20 can be shifted directly to the reproducing operation during the data reading operation, without repeated seeks to the start position of data, because the postcode for reproducing is formed resulting in the YAW angle for the postcode for recording.

Moreover, in the region adjacent the postcode in the radial direction of the storage medium 10, the user data or the like is not written when it is formed as the blank area 71. The reason is that the total storage capacity used for the user data increases when the data other than the postcode such as user data is recorded to the blank area 71. However, the problem, which is similar to the problem generated in the related art where the postcodes are provided adjacently, of a part of the adjacent data being detected as noise and generating a read error in the postcode when the head position is fluctuated is generated. Thus, the positioning accuracy of the magnetic head 20 cannot be improved and high density recording of the storage medium 10 cannot be realized.

Moreover, the correcting data for adjacent two servo frames 50 in the track (circumferential) direction on the same track are recorded in one postcode. The servo frames 50 corresponding to each postcode are two servo frames after the servo frame where the relevant postcode is allocated. The reason is that individual postcodes of each servo frame are separated previously from postcode, the correcting signal is calculated, and positioning of the magnetic head can be done immediately when the magnetic head 20 moves on the tracks and arrives at the servo frame to be corrected. Accordingly, when the magnetic head 20 is moving in the regions among the servo frames 50, it is always following the tracks, and thereby, the problem of unstable write of data and data read error due to the fluctuation of the magnetic head 20 can be solved. Moreover, with the structure explained above, high speed positioning can be realized.

As also explained above, the correcting data of adjacent two servo frames 50 in the track (circumferential) direction of the same track is included in one postcode 40 and the postcodes 41, 42 are allocated in the form of a lattice. Therefore, the region to provide intervals to the postcodes 41, 42 which are allocated at least adjacently in the radial direction (track crossing direction) of the storage medium 10 can be acquired with least reduction of the storage capacity of the user data region. Moreover, in the other embodiments, it is possible to employ a structure so that the correcting data of the postcodes corresponding to three or more servo frames is included in one postcode 40. In this case, the postcodes 40 are allocated alternately in separation for a plurality of servo frames or resulting in deviation.

Moreover, the postcode 42 for reproducing is allocated continuously after the postcode 41 for recording within the same postcode region 70. However, in the other embodiments, it is also possible to introduce a structure such that the postcode 41 for recording is allocated continuously after the postcode 42 for reproducing within the same storage region 70. Also, since the correcting data of the postcodes respectively corresponding to a plurality of servo frames is gathered and recorded only to one postcode, the capacity used for the information indicating start of the postcode can be reduced.

As also explained above, the postcode 42 for reproducing to correct the user data reading position is additionally allocated after the postcodes 41 for reproducing arranged in the form of a lattice. Accordingly, the problems of read error due to detection of postcodes of the adjacent tracks as noise when the magnetic head reads the postcodes and overwriting of data on the adjacent postcodes at the time of writing the postcodes can be prevented. Thereby, highly accurate reproduction of postcodes can be realized.

Moreover, the postcode 42 for reproducing to correct the user data reading position is additionally allocated after the postcode 41 for recording. Therefore, highly accurate positioning of the magnetic head can be conducted not only in the data recording operation but also in the data reproducing operation. Further, since the postcode 42 for reproducing is set resulting in the YAW angle for the postcode 41 for recording, the magnetic head can be shifted directly to the reproducing operation to enable high speed and stable reproducing operation without re-seek up to the start position of data during the data reading operation.

As explained in the second and third embodiments, since the two postcodes 41, 42 for recording and reproducing used to correct the same servo frame are allocated side by side in the postcode region in the track direction and the postcodes for recording and reproducing of the adjacent tracks are allocated in the form of a lattice with separation of at lease one servo frame, the postcode region 70 has the width of about two times the width in the first embodiment and storage capacity of user data region is reduced as much. However, the storage capacity of the postcode region 70 is controlled to the minimum capacity required and the positioning of both recording and reproducing heads can be realized in high speed and high accuracy.

Moreover, as illustrated in the figures, since the region which is continuous in the radial direction and extended to the internal circumference from the external circumference of the storage medium 10 is acquired as the region 70 for postcode, cross-erase and crosstalk of the postcodes among the adjacent tracks are prevented. In addition, the allocation of the user data region is similar to that in the related art.

The present invention relates to a storage apparatus for controlling the position of a head on the basis of the correcting data for correcting an error of the servo signal. Accordingly, it is possible to provide a highly reliable storage medium which can prevent influence on the adjacent correcting data, and realize stable recording and reproducing operations of data without remarkable reduction of the recording capacity of the user data area.

Moreover, the present invention is particularly effective in the storage apparatus using a high density storage medium having narrow track pitch. Cross-erases and cross-talks among the correcting data due to reduction in track pitch typical in high density storage medium can be prevented and the correcting data can be recorded or reproduced with higher accuracy by isolating the correcting data in the adjacent tracks. As a result, high speed and highly accurate head positioning can be realized.

What is claimed is:

1. A storage medium comprising:
   a plurality of tracks extending in a circumferential direction;
   a plurality of user data areas formed on the tracks for storing user data;
   a plurality of servo frames corresponding to the user data areas and extending in a radial direction for storing servo data; and
   a plurality of data correcting areas corresponding to the servo frames and extending in the radial direction adjacent the servo frames for storing correcting data for correcting positional deviation of a read head resulting from an error in the servo data stored in the servo frames;
   wherein a read correcting data stored in the data correcting areas on a same track are separated by at least one correcting data area, and
   wherein the read correcting data are stored in the data correcting areas so that the read correcting data stored in a same data correcting area are separated by at least one track.

2. The storage medium as defined in claim 1, wherein the read correcting data and a write correcting data for correcting positional deviation of a write head resulting from an error in the servo data stored in the servo frames are stored parallel to each other in the circumferential direction within a same data correction area.

3. The storage medium as defined in claim 2, wherein the read correcting data and the write correcting data are stored offset from each other in the radial direction.

4. A storage apparatus comprising:
a read/write head;
a storage medium for storing user data, servo data and correcting data for correcting positional deviation of the read/write head resulting from an error in the servo data;
position control unit for controlling the position of the read/write head based on the servo data and a read correcting data; and
control unit for writing and/or reading data at the position controlled by the position control unit;
wherein the storage medium includes a plurality of tracks extending in a circumferential direction, a plurality of user data areas formed on the tracks for storing the user data, a plurality of servo frames corresponding to the user data areas and extending in a radial direction for storing the servo data, and a plurality of data correcting areas corresponding to the servo frames and extending in the radial direction adjacent the servo frames for storing the read correcting data; and
wherein the read correcting data stored in the data correcting areas on a same track are separated by at least one correcting data area and wherein the read correcting data are stored in the data correcting areas so that the correcting data stored in a same data correcting area are separated by at least one track.

5. The storage medium as defined in claim 4, wherein the read correcting data and a write correcting data for correcting positional deviation of a write head resulting from an error in the servo data stored in the servo frames are stored parallel to each other in the circumferential direction within a same data correcting area.

6. The storage medium as defined in claim 5, wherein the read correcting data and the write correcting data are stored offset from each other in the radial direction.

* * * * *